(12) United States Patent
Lin

(10) Patent No.: US 6,259,615 B1
(45) Date of Patent: Jul. 10, 2001

(54) HIGH-EFFICIENCY ADAPTIVE DC/AC CONVERTER

(75) Inventor: Yung-Lin Lin, Palo Alto, CA (US)

(73) Assignee: O2 Micro International Limited, Grand Cayman (KY)

(*) Notice: Subject to any disclaimer, the term of this patent is extended or adjusted under 35 U.S.C. 154(b) by 0 days.

(21) Appl. No.: 09/437,081

(22) Filed: Nov. 9, 1999

(51) Int. Cl.$^7$ .......................... H02M 3/335; H02M 3/24; H05B 37/02

(52) U.S. Cl. ........................... 363/98; 363/25; 315/225; 315/307

(58) Field of Search .............................. 363/98, 96, 97, 363/31, 40, 41, 95, 25; 315/160, 127, 128, 175, 225, 119, 307

(56) References Cited

U.S. PATENT DOCUMENTS

| | | | |
|---|---|---|---|
| 4,535,399 | * 8/1985 | Szepesi | 363/20 |
| 4,541,041 | 9/1985 | Park et al. | 363/41 |

(List continued on next page.)

OTHER PUBLICATIONS

"An Introduction to the Principles and Features of Resonant Power Conversion", Steve Freeland, from *Recent Developments in Resonant Power Conversion*, Intertec Communications, Inc., 1988, pp. 20–43, No Date.

"Zero–Voltage Switching Techniques in DC/DC Converters", Kwang–Hwa Liu and Fred C. Lee, from *Recent Developments in Resonant Power Conversion*, Intertec Communications, Inc., 1988, pp. 211–223, No Date.

"A New and Improved Control Technique Greatly Simplifies the Design of ZVS Resonant Inverters and DC/DC Power Supplies", Mehmet K. Nalbant, 1995 IEEE pp. 694–701, No date.

*Switching Power Supply Design*, Abraham I. Pressman, McGraw–Hill, 1991, pp. 93–104; 471–492, No date.

"Phase Shifted, Zero Voltage Transition Design Considerations and the UC3875 PWM Controller", by Bill Andreycak, Unitrode, Application Note, May 1997, pp. 1–14.

"Fixed–Frequency, Resonant–Switched Pulse Width Modulation with Phase–Shifted Control", by Bob Mammano and Jeff Putsch, from *Power Supply Design Seminar*, Unitrode, 1991, pp. 5–1 to 5–7.

"Zero Voltage Switching Resonant Power Conversion", by Bill Andreycak, from *Power Supply Design Seminar*, Unitrode, 1991, pp. A2–1 to A2–24; and A2–1A to A2–3A, No Date.

"Resonant Mode Converter Topologies", by Bob Mammano, from *Power Supply Design Seminar*, Unitrode, 1991, pp. P3–1 to P3–12, No Date.

"The New UC3879 Phase–Shifed PWM Controller Simplifies the Design of Zero Voltage Transition Full–Bridge Converters"by Laszlo Balogh, Unitrode, Application Note, 1995, pp. 1–8, No Date.

"A Comparative Study of a Class of Full–Bridge Zero–Voltage–Switched PWM Converters", by W. Chen et al., 1995 IEEE, pp. 893–899, No Date.

(List continued on next page.)

Primary Examiner—Rajnikant B. Patel
(74) Attorney, Agent, or Firm—Hayes, Soloway, Hennessey, Grossman & Hage, P.C.

(57) ABSTRACT

A CCFL power converter circuit is provided using a high-efficiency zero-voltage-switching technique that eliminates switching losses associated with the power MOSFETs. An optimal sweeping-frequency technique is used in the CCFL ignition by accounting for the parasitic capacitance in the resonant tank circuit. Additionally, the circuit is self-learning and is adapted to determine the optimum operating frequency for the circuit with a given load. An over-voltage protection circuit can also be provided to ensure that the circuit components are protected in the case of open-lamp condition.

42 Claims, 11 Drawing Sheets

U.S. PATENT DOCUMENTS

| | | | |
|---|---|---|---|
| 4,672,528 | 6/1987 | Park et al. | 363/98 |
| 4,727,469 | 2/1988 | Kammiller | 363/56 |
| 4,794,506 * | 12/1988 | Hino et al. | 363/17 |
| 4,814,962 | 3/1989 | Magalhaes et al. | 363/16 |
| 4,833,584 | 5/1989 | Divan | 363/37 |
| 4,855,888 | 8/1989 | Henze et al. | 363/132 |
| 4,860,189 | 8/1989 | Hitchcock | 363/132 |
| 4,864,483 | 9/1989 | Divan | 363/37 |
| 4,912,622 | 3/1990 | Steigerwald et al. | 363/98 |
| 4,935,857 | 6/1990 | Nguyen et al. | 363/17 |
| 4,952,849 | 8/1990 | Fellows et al. | 315/307 |
| 4,953,068 | 8/1990 | Henze | 363/17 |
| 4,992,919 | 2/1991 | Lee et al. | 363/17 |
| 5,017,800 | 5/1991 | Divan | 307/66 |
| 5,027,263 | 6/1991 | Harada et al. | 363/16 |
| 5,027,264 | 6/1991 | Dedoncker et al. | 363/16 |
| 5,105,127 | 4/1992 | Lavaud et al. | 315/291 |
| 5,113,334 | 5/1992 | Tuson et al. | 363/25 |
| 5,132,888 | 7/1992 | Lo et al. | 363/17 |
| 5,132,889 | 7/1992 | Hitchcock et al. | 363/17 |
| 5,157,592 | 10/1992 | Walters | 363/17 |
| 5,198,969 | 3/1993 | Redl et al. | 363/17 |
| 5,208,740 | 5/1993 | Ehsani | 363/124 |
| 5,231,563 | 7/1993 | Jitaru | 363/98 |
| 5,235,501 | 8/1993 | Stuart et al. | 363/17 |
| 5,268,830 | 12/1993 | Loftus, Jr. | 363/17 |
| 5,285,372 | 2/1994 | Huynh et al. | 363/132 |
| 5,291,382 | 3/1994 | Cohen | 363/16 |
| 5,305,191 | 4/1994 | Loftus, Jr. | 363/17 |
| 5,363,020 | 11/1994 | Chen et al. | 315/209 R |
| 5,384,516 * | 1/1995 | Kawabata et al. | 315/160 |
| 5,402,329 | 3/1995 | Wittenbreder, Jr. | 363/16 |
| 5,412,557 | 5/1995 | Lauw | 363/37 |
| 5,418,703 | 5/1995 | Hitchcock et al. | 363/17 |
| 5,420,779 | 5/1995 | Payne | 363/56 |
| 5,422,546 | 6/1995 | Nilssen | 315/219 |
| 5,430,632 | 7/1995 | Meszlenyi | 363/17 |
| 5,430,641 | 7/1995 | Kates | 363/133 |
| 5,448,155 | 9/1995 | Jutras | 323/285 |
| 5,448,467 | 9/1995 | Ferreira | 363/17 |
| 5,481,160 | 1/1996 | Nilssen | 315/209 R |
| 5,510,974 | 4/1996 | Gu et al. | 363/134 |
| 5,514,921 | 5/1996 | Steigerwald | 307/125 |
| 5,546,300 | 8/1996 | Lee et al. | 363/132 |
| 5,559,688 | 9/1996 | Pringle | 363/89 |
| 5,615,093 | 3/1997 | Nalbant | 363/25 |
| 5,619,402 | 4/1997 | Liu | 363/20 |
| 5,638,260 | 6/1997 | Bees | 363/17 |
| 5,646,836 | 7/1997 | Sadarnac et al. | 363/98 |
| 5,669,238 | 9/1997 | Devers | 62/657 |
| 5,684,683 | 11/1997 | Divan et al. | 33/65 |
| 5,694,007 | 12/1997 | Chen | 315/247 |
| 5,712,533 | 1/1998 | Corti | 315/169.3 |
| 5,715,155 | 2/1998 | Shahani et al. | 363/132 |
| 5,719,474 | 2/1998 | Vitello | 315/307 |
| 5,731,652 | 3/1998 | Shimada | 310/316 |
| 5,736,842 | 4/1998 | Jovanovic | 323/222 |
| 5,742,495 | 4/1998 | Barone | 363/65 |
| 5,742,496 * | 4/1998 | Tsutsumi | 363/95 |
| 5,744,915 | 4/1998 | Nilssen | 315/209 R |
| 5,748,457 | 5/1998 | Poon et al. | 363/16 |
| 5,764,494 | 6/1998 | Schutten et al. | 363/17 |
| 5,774,346 | 6/1998 | Poon et al. | 363/17 |
| 5,781,418 * | 7/1998 | Chang et al. | 363/16 |
| 5,781,419 | 7/1998 | Kutkut et al. | 363/17 |
| 5,784,266 | 7/1998 | Chen | 363/16 |
| 5,796,598 | 8/1998 | Nowak et al. | 363/37 |
| 5,818,172 | 10/1998 | Lee | 315/86 |
| 5,834,889 | 11/1998 | Ge | 313/493 |
| 5,844,540 | 12/1998 | Terasaki | 345/102 |
| 5,854,617 | 12/1998 | Lee et al. | 345/102 |
| 5,856,916 | 1/1999 | Bonnet | 363/20 |
| 5,875,103 | 2/1999 | Bhagwat et al. | 363/17 |
| 5,880,940 | 3/1999 | Poon | 363/20 |
| 5,886,477 | 3/1999 | Honbo et al. | 315/209 PZ |
| 5,886,884 | 3/1999 | Baek et al. | 363/48 |
| 5,894,412 | 4/1999 | Faulk | 363/56 |
| 5,910,709 | 6/1999 | Stevanovic et al. | 315/225 |
| 5,917,722 | 6/1999 | Singh | 363/132 |
| 5,923,129 | 7/1999 | Henry | 315/307 |
| 5,930,121 | 7/1999 | Henry | 363/16 |
| 5,932,976 | 8/1999 | Maheshwari et al. | 315/291 |
| 5,939,830 | 8/1999 | Praiswater | 315/DIG. 4 |
| 5,946,200 | 8/1999 | Kim et al. | 363/17 |
| 6,011,360 * | 1/2000 | Gradzki et al. | 315/244 |
| 6,114,814 | 9/2000 | Shannon et al. | 315/219 |

OTHER PUBLICATIONS

"Optimum ZVS Full–Bridge DC/DC Converter with PWM Phase–Shift Control: Analysis, Design Considerations, and Experimental Results", by Richard Red I et al., 1994 IEEE, pp. 159–165, No Date.

"A Frequency/PWM Controlled Converter with Two Independently Regulated Outputs", by R.A Fisher et al., HFPC, May 1989, pp. 459–471.

"High Density Power–Hybrid Design of a Half–Bridge Multi–Resonant Converter", by Richard Farrington, et al., HFPC–Virginia Polytechnic Institute, May 1990, pp. 26–33.

"Small–Signal Analysis of the Zero–Voltage Switched Full–Bridge PWM Converter", V. Vlatkovic et al., HFPC–Virginia Polytechnic Institute, May 1990, pp. 262–272.

"Feasible Characteristics Evaluation of Resonant Tank PWM Inverter–Linked DC–DC High–Power Converters for Medical–Use High–Voltage Application", by H. Takano et al., 1995 IEEE, pp. 913–919, No Date.

* cited by examiner

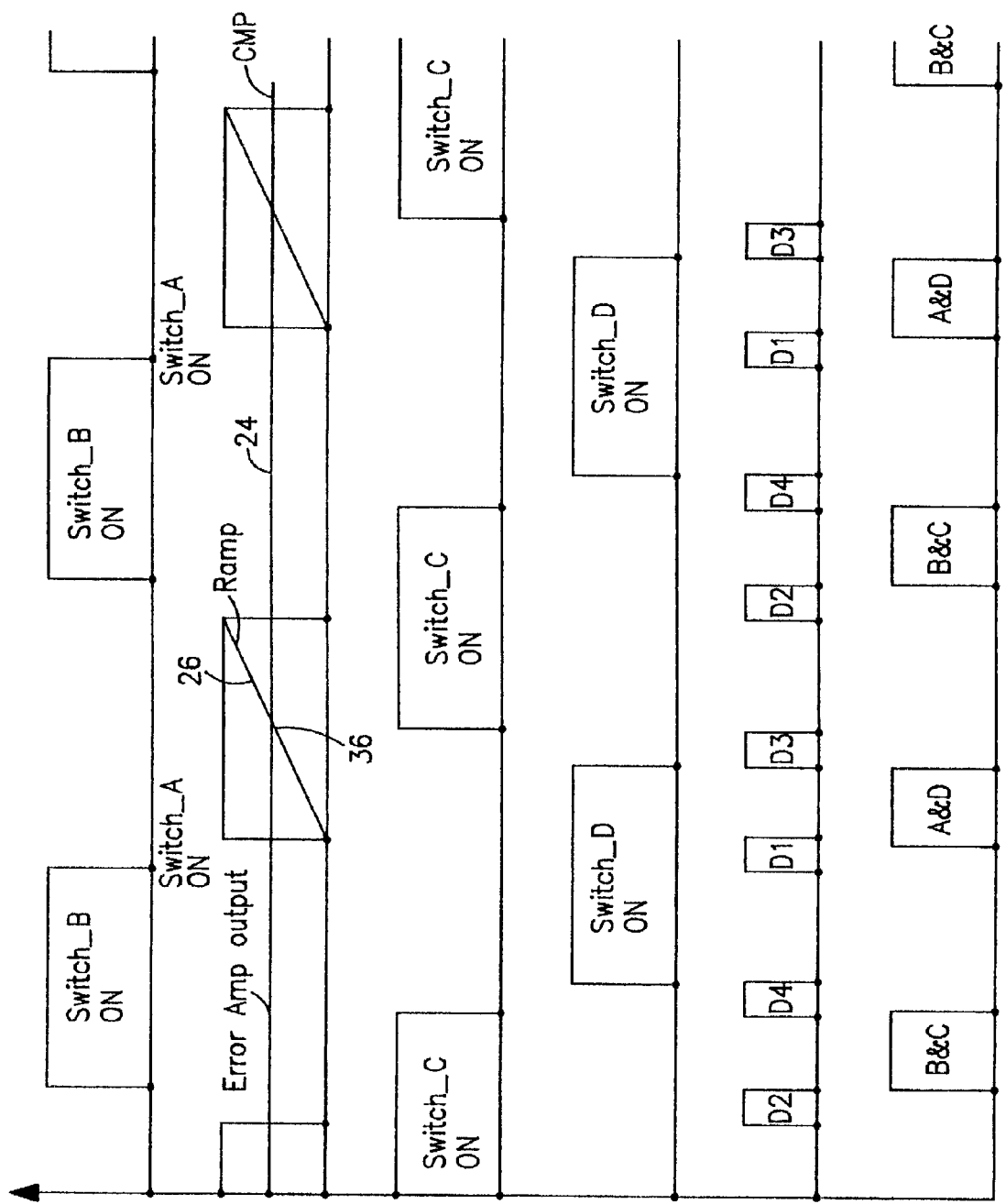

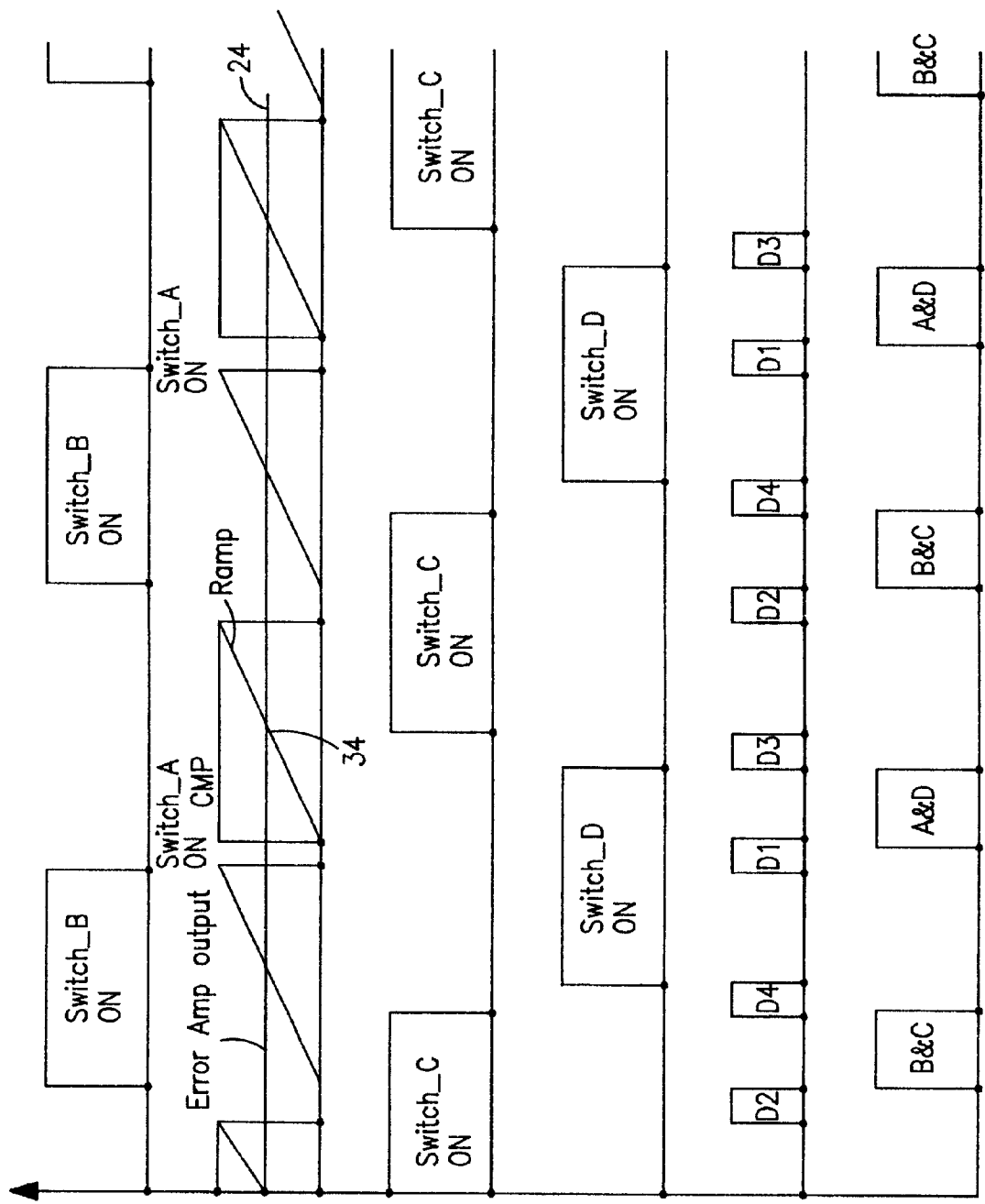

HIGH-EFFICIENCY ADAPTIVE DC/AC CONVERTER

FIELD OF THE INVENTION

The present invention is directed to a DC to AC power converter circuit. More particularly, the present invention provides a high efficiency controller circuit that regulates power delivered to a load using a zero-voltage-switching technique. General utility for the present invention is found as a circuit for driving one or more Cold Cathode Fluorescent Lamps (CCFLs), however, those skilled in the art will recognize that the present invention can be utilized with any load where high efficiency and precise power control is required.

DESCRIPTION OF RELATED ART

FIG. 1 depicts a convention CCFL power supply system 10. The system broadly includes a power supply 12, a CCFL driving circuit 16, a controller 14, a feedback loop 18, and one or more lamps CCFL associated with an LCD panel 20. Power supply 12 supplies a DC voltage to circuit 16, and is controlled by controller 14, through transistor Q3. Circuit 16 is a self-resonating circuit, known as a Royer circuit. Essentially, circuit 16 is a self-oscillating dc to ac converter, whose resonant frequency is set by L1 and C1, and N1–N4 designate transformer windings and number of turns of the windings. In operation, transistors Q1 and Q2 alternately conduct and switch the input voltage across windings N1 and N2, respectively. If Q1 is conducting, the input voltage is placed across winding N1. Voltages with corresponding polarity will be placed across the other windings. The induced voltage in N4 makes the base of Q2 positive, and Q1 conducts with very little voltage drop between the collector and emitter. The induced voltage at N4 also holds Q2 at cutoff. Q1 conducts until the flux in the core of TX1 reaches saturation.

Upon saturation, the collector of Q1 rises rapidly (to a value determined by the base circuit), and the induced voltages in the transformer decrease rapidly. Q1 is pulled further out of saturation, and $V_{CE}$ rises, causing the voltage across N1 to further decrease. The loss in base drive causes Q1 to turn off, which in turn causes the flux in the core to fall back slightly and induces a current in N4 to turn on Q2. The induced voltage in N4 keeps Q1 conducting in saturation until the core saturates in the opposite direction, and a similar reversed operation takes place to complete the switching cycle.

Although the inverter circuit 16 is composed of relatively few components, its proper operation depends on complex interactions of nonlinearities of the transistors and the transformer. In addition, variations in C1, Q1 and Q2 (typically, 35% tolerance) do not permit the circuit 16 to be adapted for parallel transformer arrangements, since any duplication of the circuit 16 will produce additional, undesirable operating frequencies, which may resonate at certain harmonics. When applied to a CCFL load, this circuit produces a "beat" effect in the CCFLs, which is both noticeable and undesirable. Even if the tolerances are closely matched, because circuit 16 operates in self-resonant mode, the beat effects cannot be removed, as any duplication of the circuit will have its own unique operating frequency.

Some other driving systems can be found in U.S. Pat. Nos. 5,430,641; 5,619,402; 5,615,093; 5,818,172. Each of these references suffers from low efficiency, two-stage power conversion, variable-frequency operation, and/or load dependence. Additionally, when the load includes CCFL(s) and assemblies, parasitic capacitances are introduced, which affects the impedance of the CCFL itself. In order to effectively design a circuit for proper operation, the circuit must be designed to include consideration of the parasitic impedances for driving the CCFL load. Such efforts are not only time-consuming and expensive, but it is also difficult to yield an optimal converter design when dealing with various loads. Therefore, there is a need to overcome these drawbacks and provide a circuit solution that features high efficiency, reliable ignition of CCFLs, load-independent power regulation and single frequency power conversion.

SUMMARY OF THE INVENTION

Accordingly, the present invention provides an optimized system for driving a load, obtains an optimal operation for various LCD panel loads, thereby improving the reliability of the system.

Broadly defined, the present invention provides A DC/AC converter circuit for controllably delivering power to a load, comprising an input voltage source; a first plurality of overlapping switches and a second plurality of overlapping switches being selectively coupled to said voltage source, the first plurality of overlapping switches defining a first conduction path, the second plurality of overlapping switches defining a second conduction path. A pulse generator is provided to generate a pulse signal. Drive circuitry receives the pulse signal and controls the conduction state of the first and second plurality of switches. A transformer is provided having a primary side and a secondary side, the primary side is selectively coupled to the voltage source in an alternating fashion through the first conduction path and, alternately, through the second conduction path. A load is coupled to the secondary side of the transformer. A feedback loop circuit is provided between the load and the drive circuitry that supplies a feedback signal indicative of power being supplied to the load. The drive circuitry alternates the conduction state of the first and second plurality of switches, and the overlap time of the switches in the first plurality of switches, and the overlap time of the switches in the second plurality of switches, to couple the voltage source to the primary side based at least in part on the feedback signal and the pulse signal.

The drive circuitry is constructed to generate a first complimentary pulse signal from the pulse signal, and a ramp signal from the pulse signal. The pulse signal is supplied to a first one of the first plurality of switches to control the conduction state thereof, and the ramp signal is compared with at least the feedback signal to generate a second pulse signal, where a controllable conduction overlap condition exists between the conduction state of the first and second switches of the first plurality of switches. The second pulse signal is supplied to a second one of the first plurality of switches and controlling the conduction state thereof. The drive circuitry further generates a second complimentary pulse signal based on the second pulse signal, wherein said first and second complimentary pulse signals control the conduction state of a first and second ones of the second plurality of switches, respectively. Likewise, a controllable conduction overlap condition exists between the conduction state of the first and second switches of the second plurality of switches.

In method form, the present invention provides a method for controlling a zero-voltage switching circuit to deliver power to a load comprising the steps of supplying a DC voltage source; coupling a first and second transistor defining a first conduction path and a third and fourth transistor defining a second conduction path to the voltage source and a primary side of a transformer; generating a pulse signal to having a predetermined pulse width; coupling a load to a secondary side of said transformer; generating a feedback signal from the load; and controlling the feedback signal and the pulse signal to determine the conduction state of said first, second, third and fourth transistors.

In the first embodiment, the present invention provides a converter circuit for delivering power to a CCFL load, which includes a voltage source, a transformer having a primary side and a secondary side, a first pair of switches and a second pair of switches defining a first and second conduction path, respectively, between the voltage source and the primary side, a CCFL load circuit coupled to the secondary side, a pulse generator generating a pulse signal, a feedback circuit coupled to the load generating a feedback signal, and drive circuitry receiving the pulse signal and the feedback signal and coupling the first pair of switches or the second pair of switches to the voltage source and the primary side based on said pulse signal and said feedback signal to deliver power to the CCFL load.

Additionally, the first embodiment provides a pulse generator that generates a pulse signal having a predetermined frequency. The drive circuitry includes first, second, third and fourth drive circuits; and the first pair of switches includes first and second transistors, and the second pair of switches includes third and fourth transistors. The first, second, third and fourth drive circuits are connected to the control lines of the first, second, third and fourth transistors, respectively. The pulse signal is supplied to the first drive circuit so that the first transistor is switched in accordance with the pulse signal. The third drive circuit generates a first complimentary pulse signal and a ramp signal based on the pulse signal, and supplies the first complimentary pulse signal to the third transistor so that the third transistor is switched in accordance with the first complimentary pulse signal. The ramp signal and the feedback signal are compared to generate a second pulse signal. The second pulse signal is supplied to the second drive circuit so that the second transistor is switched in accordance with the second pulse signal. The forth driving circuit generates a second complementary pulse signal based on the second pulse signal and supplies the second complementary pulse signal to the fourth transistor so that the fourth transistor is switched in accordance with the second complimentary pulse signal. In the present invention, the simultaneous conduction of the first and second transistors, and the third and fourth transistors, respectively, controls the amount of power delivered to the load. The pulse signal and the second pulse signal are generated to overlap by a controlled amount, thus delivering power to the load along the first conduction path. Since the first and second complementary pulse signals are generated from the pulse signal and second pulse signal, respectively, the first and second complementary pulse signals are also generated to overlap by a controlled amount, power is delivered to the load along the second conduction path, in an alternating fashion between the first and second conduction paths.

Also, the pulse signal and first complementary pulse signal are generated to be approximately 180° out of phase, and the second pulse signal and the second complementary signal are generated to be approximately 180° out of phase, so that a short circuit condition between the first and second conduction paths is avoided In addition to the converter circuit provided in the first embodiment, the second embodiment includes a flip-flop circuit coupled to the second pulse signal, which triggers the second pulse signal to the second drive signal only when the third transistor is switched into a conducting state. Additionally, the second embodiment includes, a phase-lock loop (PLL) circuit having a first input signal from the primary side and a second input signal using the feedback signal. The PLL circuit compares the phase difference between these two signals and supplies a control signal to the pulse generator to control the pulse width of the pulse signal based on the phase difference between the first and second inputs.

In both embodiments, the preferred circuit includes the feedback control loop having a first comparator for comparing a reference signal with the feedback signal and producing a first output signal. A second comparator is provided for comparing said first output signal with the ramp signal and producing said second pulse signal based on the intersection of the first output signal and the ramp signal. The feedback circuit also preferably includes a current sense circuit receiving the feedback signal and generating a trigger signal, and a switch circuit between the first and second comparator, the switch circuit receiving the trigger signal and generating either the first output signal or a predetermined minimum signal, based on the value of the trigger signal. The reference signal can include, for example, a signal that is manually generated to indicate a desires power to be delivered to the load. The predetermined minimum svoltage signal can include a programmed minimum voltage supplied to the switches, so that an overvoltage condition does not appear across the load.

Likewise, in both embodiments described herein, an overcurrent protection circuit can be provided that receives the feedback signal and controls the pulse generator based on the value of said feedback signal. An overvoltage protection can be provided to receive a voltage signal from across the load and the first output signal and compare the voltage signal from across the load and the first output signal, to control the pulse generator based on the value of the voltage signal from across the load.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIGS. 2a–2f is an exemplary timing diagram of the circuit of FIG. 2;

FIGS. 3a–3f is an exemplary timing diagram of the circuit of FIG. 3; and

DETAILED DESCRIPTION OF THE INVENTION

While not wishing to be bound by example, the following Detailed Description will proceed with reference to a CCFL panel as the load for the circuit of the present invention. However, it will be apparent that the present invention is not limited only to driving one or CCFLs, rather, the present invention should be broadly construed as a power converter circuit and methodology independent of the particular load for a particular application.

As an overview, the present invention provides circuitry to controllably deliver power to a load using feedback signals and pulse signals to adjust the ON time of two pairs of switches. When one pair of switches are controllably turned ON such that their ON times overlap, power is delivered to a load (via a transformer), along a conduction path defined by the pair of switches. Likewise, when the other pair of switches are controllably turned ON such that their ON times overlap, power is delivered to a load (via a transformer), along a conduction path defined by other pair of switches. Thus, by selectively turning ON switches and controlling the overlap between—switches, the present invention can precisely control power delivered to a given load. Additionally, the present invention includes over-current and over-voltage protection circuits, which discontinues power to the load in the event of a short circuit or open circuit condition. Moreover, the controlled switching topology described herein enables the circuit to operate irrespective of the load, and with a single operating frequency independent of the resonant effects of the transformer arrangement. These features are discussed below with reference to the drawings.

Figure 1:
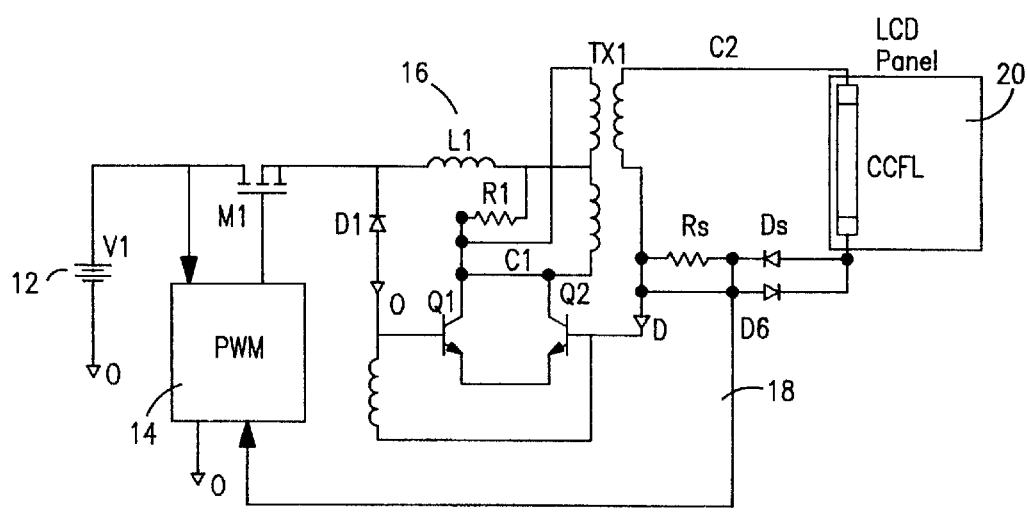
FIG. 1 is a conventional DC/AC converter circuit.
Figure 2:
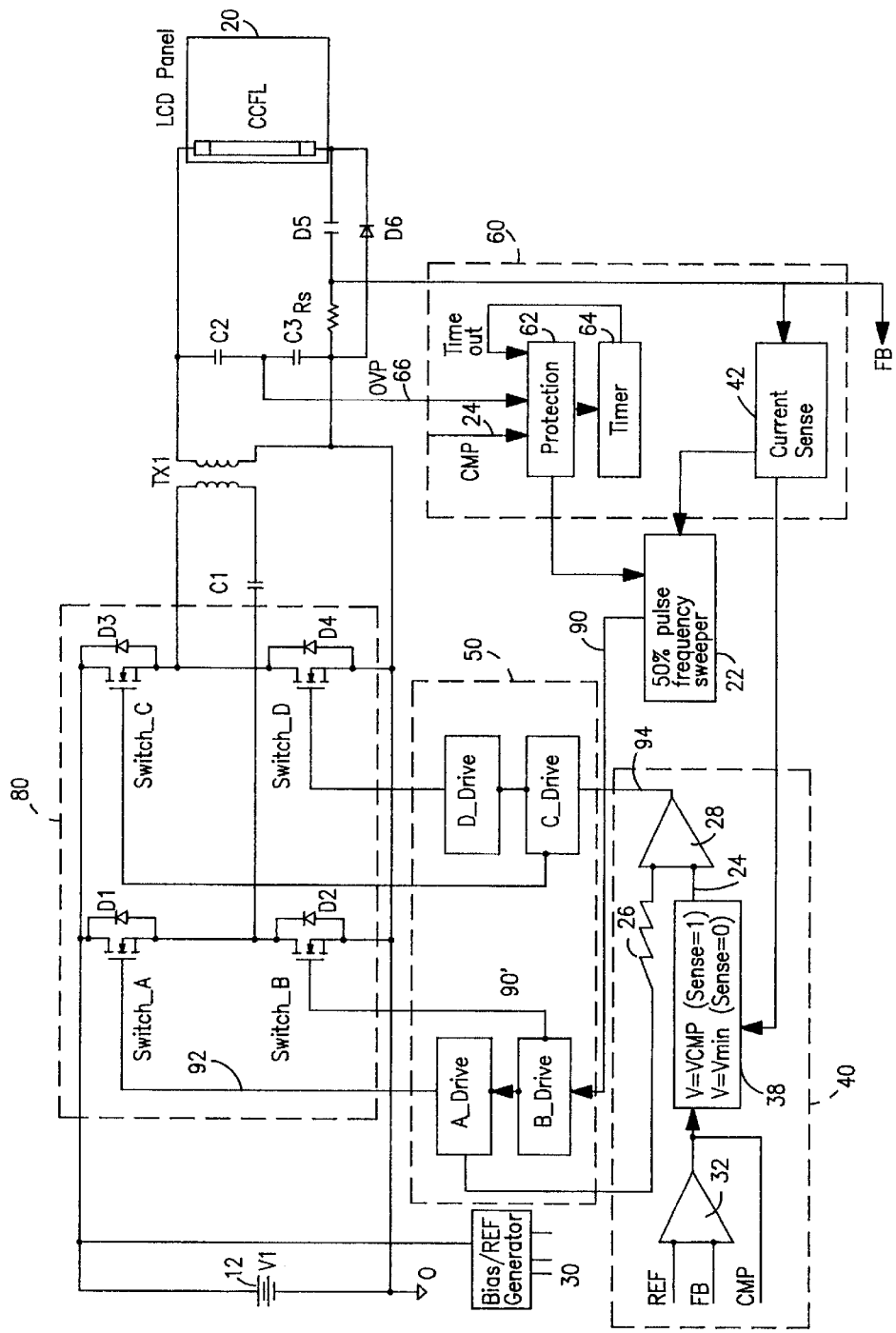
FIG. 2 is one preferred embodiment of a DC/AC converter circuit of the present invention.

The circuit diagram shown in FIG. 2 illustrates one preferred embodiment of a phase-shift, full-bridge, zero-voltage-switching power converter of the present invention. Essentially, the circuit shown in FIG. 2 includes a power source 12, a plurality of switches 80 arranged as diagonal pairs of switches defining alternating conduction paths, drive circuitry 50 for driving each of the switches, a frequency sweeper 22 which generates a square wave pulse to the drive circuitry 50, a transformer TX1 (with an associated resonant tank circuit defined by the primary side of TX1 and C1) and a load. Advantageously, the present invention also includes an overlap feedback control loop 40 which controls the ON time of at least one of each pair of switches, thereby permitting controllable power to be delivered to the load.

A power source 12 is applied to the system. Initially, a bias/reference signal 30 is generated for the control circuitry (in control loop 40) from the supply. Preferably, a frequency sweeper 22 generates a 50% duty-cycle pulse signal, starting with an upper frequency and sweeping downwards at a pre-determined rate and at pre-determined steps (i.e., square wave signal of variable pulse width). The frequency sweeper 22 preferably is a programmable frequency generator, as is known in the art. The pulse signal 90 (from the sweeper 22) is delivered to B_Drive (which drives the Switch_B, i.e., controls the gate of Switch_B), and is delivered to A_Drive, which generates a complementary pulse signal 92 and a ramp signal 26. The complementary pulse signal 92 is approximately 180° out of phase with pulse signal 90, and the ramp signal 26 is approximately 90° out of phase with pulse signal, as will be described below. The ramp signal is preferably a sawtooth signal, as shown in the Figure. The ramp signal 26 is compared with the output signal 24 (referred to herein as CMP) of the error amplifier 32, through comparator 28, thus generating signal 94. The output signal 94 of the comparator 28 is likewise a 50% duty pulse delivered to C_Drive to initiate the turning on of Switch_C which, in turn, determines the amount of overlap between the switches B and C, and switches A and D. Its complimentary signal (phased approximately 180°) is applied to Switch_D, via D_Drive. It will be understood by those skilled in the art that circuits Drive_A–Drive_D are connected to the control lines (e.g., gate) of Switch_A–Switch_D, respectively, which permits each of the switches to controllably conduct, as described herein. By adjusting the amount of overlap between switches B, C and A, D, lamp-current regulation is achieved. In other words, it is the amount of overlapping in the conduction state of the pairs of switches that determines the amount of power processed in the converter. Hence, switches B and C, and switches A and D, will be referred to herein as overlapping switches.

While not wishing to be bound by example, in this embodiment, B_Drive is preferably formed of a totem pole circuit, generic low-impedance op-amp circuit, or emitter follower circuit. C_Drive is likewise constructed. Since both A-Drive and D_Drive are not directly connected to ground (i.e., floating), it is preferred that these drives are formed of a boot-strap circuit, or other high-side drive circuitry known in the art. Additionally, as stated above, A_Drive and D_Drive include an inverter to invert (i.e., phase) the signal flowing from B_Drive and C_Drive, respectively.

High-efficiency operation is achieved through a zero-voltage-switching technique. The four MOSFETs (Switch_A–Switch_D) 80 are turned on after their intrinsic diodes (D1–D4) conduct, which provides a current flowing path of energy in the transformer/capacitor (TX1/C1) arrangement, thereby ensuring that a zero voltage is across the switches when they are turned on. With this controlled operation, switching loss is minimized and high efficiency is maintained.

The preferred switching operation of the overlapping switches 80 is shown with reference to the timing diagrams of FIGS. 2a–2f. Switch_C is turned off at certain period of the conduction of both switches B and C (FIG. 2f). The current flowing in the tank (refer to FIG. 2) is now flowing through diode D4 (FIG. 2e) in Switch_D, the primary of transformer, C1, and Switch_B, after Switch_C is turned off, thereby resonating the voltage and current in capacitor C1 and the transformer as a result of the energy delivered when switches B and C were conducting (FIG. 2f). Note that this condition must occur, since an instantaneous change in current direction of the primary side of the transformer would violate Faraday's Law. Thus, current must flow through D4 when Switch_C turns off. Switch_D is turned on after D4 has conducted. Similarly, Switch_B is turned off (FIG. 2a), the current diverts to Diode D1 associated with Switch_A before Switch_A is turned on (FIG. 2e). Likewise, Switch_D is turned off (FIG. 2d), and the current is now flowing now from Switch_A, through C1, the transformer primary and Diode D3. Switch_C is turned on after D3 has conducted (FIG. 2e). Switch_B is turned on after Switch_A is turned off which allows the diode D2 to conduct first before it is turned on. Note that the overlap of turn-on time of the diagonal switches B,C and A,D determines the energy delivered to the transformer, as shown in FIG. 2f.

In this embodiment, FIG. 2b shows that the ramp signal 26 is generated only when Switch_A is turned on. Accordingly, Drive_A, which generates the ramp signal 26, preferably includes a constant current generator circuit (not shown) that includes a capacitor having an appropriate time constant to create the ramp signal. To this end, a reference current (not shown) is utilized to charge the capacitor, and the capacitor is grounded (via, for example a transistor switch) so that the discharge rate exceeds the charge rate, thus generating the sawtooth ramp signal 26. Of course, as noted above, this can be accomplished by integrating the pulse signal 90, and thus, the ramp signal 26 can be formed using an integrator circuit (e.g., op-amp and capacitor).

In the ignition period, a pre-determined minimum overlap between the two diagonal switches is generated (i.e., between switches A,D and B,C). This gives a minimum energy from the input to the tank circuit including C1, transformer, C2, C3 and the CCFL load. Note that the load can be resistive and/or capacitive. The drive frequency starts at a predetermined upper frequency until it approaches the resonant frequency of the tank circuit and equivalent circuit reflected by the secondary side of the transformer, a significant amount of energy is delivered to the load where the CCFL is connected. Due to its high-impedance characteristics before ignition, the CCFL is subjected to high voltage from the energy supplied to the primary side. This voltage is sufficient to ignite the CCFL. The CCFL impedance decreases to its normal operating value (e.g., about 100 Kohm to 130 Kohm), and the energy supplied to the primary side based on the minimum-overlap operation is no longer sufficient to sustain a steady state operation of the CCFL. The output of the error amplifier 26 starts its regulating function to increase the overlap. It is the level of the error amplifier output determines the amount of the overlap. For example:

Referring to FIGS. 2b and 2c and the feedback loop 40 of FIG. 2, it is important to note that Switch_C is turned on when the ramp signal 26 (generated by Drive_A) is equal to the value of signal CMP 24 (generated by error amplifier 32), determined in comparator 28. This is indicated as the intersection point 36 in FIG. 2b. To prevent a short circuit, switches A,B and C,D must never be ON simultaneously. By controlling the CMP level, the overlap time between switches A,D and B,C regulates the energy delivered to the transformer. To adjust the energy delivered to the transformer (and thereby adjust the energy delivered to the CCFL load), switches C and D are time-shifted with respect to switches A and B, by controlling the error amplifier output, CMP 24. As can be understood by the timing diagrams, if the driving pulses from the output of comparator 28 into switches C and D are shifted to the right by increasing the level of CMP, an increase in the overlap between switches A,C and B,D is realized, thus increasing the energy delivered to the transformer. In practice, this corresponds to the higher-lamp current operation. Conversely, shifting the driving pulses of switches C and D to the left (by decreasing the CMP signal) decreases the energy delivered.

To this end, error amplifier 32 compares the feedback signal FB with a reference voltage REF. FB is a measure of the current value through the sense resistor Rs, which is indicative of the total current through the load 20. REF is a signal indicative of the desired load conditions, e.g., the desired current to flow through the load. During normal operation, REF=FB. If, however, load conditions are intentionally offset, for example, from a dimmer switch associated with an LCD panel display, the value of REF will increase/decrease accordingly. The compared value generates CMP accordingly. The value of CMP is reflective of the load conditions and/or an intentional bias, and is realized as the difference between REF and FB (i.e., REF−FB).

To protect the load and circuit from an open circuit condition at the load (e.g., open CCFL lamp condition during normal operation). the FB signal is also preferably compared to a reference value (not shown and different from the REF signal described above) at the current sense comparator 42, the output of which defines the condition of switch 28, discussed below. This reference value can be programmable, and/or user-definable, and preferably reflects the minimum or maximum current permitted by the system (for example, as may be rated for the individual components, and, in particular, the CCFL load). If the value of the feedback FB signal and the reference signal is within a permitted range (normal operation), the output of the current sense comparator is 1 (or, HIGH). This permits CMP to flow through switch 38, and the circuit operates as described herein to deliver power to the load. If, however, the value of the FB signal and the reference signal is outside a predetermined range (open circuit or short circuit condition), the output of the current sense comparator is 0 (or, LOW), prohibiting the CMP signal from flowing through the switch 38. (Of course, the reverse can be true, in which the switch triggers on a LOW condition). Instead a minimal voltage Vmin is supplied by switch 38 (not shown) and applied to comparator 28 until the current sense comparator indicates permissible current flowing through Rs. Accordingly, switch 38 includes appropriate programmable voltage selection Vmin for when the sense current is 0. Turning again to FIG. 2b, the effect of this operation is a lowering of the CMP DC value to a nominal, or minimum, value (i.e., CMP=Vmin) so that a high voltage condition is not appearing on the transformer TX1. Thus, the crossover point 36 is shifted to the left, thereby decreasing the amount of overlap between complementary switches (recall Switch_C is turned ON at the intersection point 36). Likewise, current sense comparator 42 is connected to the frequency generator 22 to turn the generator 22 off when the sense value is 0 (or some other preset value indicative of an open-circuit condition). The CMP is fed into the protection circuit 62. This is to shut off the frequency sweeper 22 if the CCFL is removed during operation (open-circuit condition).

To protect the circuit from an over-voltage condition, the present embodiment preferably includes protection circuit 60, the operation of which is provided below (the description of the over current protection through the current sense comparator 42 is provided above). The circuit 60 includes a protection comparator 62 which compares signal CMP with a voltage signal 66 derived from the load 20. Preferably, voltage signal is derived from the voltage divider C2 and C3 (i.e., in parallel with load 20), as shown in FIG. 2. In the open-lamp condition, the frequency sweeper continues sweeping until the OVP signal 66 reaches a threshold. The OVP signal 62 is taken at the output capacitor divider C2 and C3 to detect the voltage at the output of the transformer TX1. To simplify the analysis, these capacitors also represent the lump capacitor of the equivalent load capacitance. The threshold is a reference and circuit is being designed so that the voltage at the secondary side of the transformer is greater than the minimum striking voltage (e.g., as may be required by the LCD panel) while less than the rated voltage of the transformer. When OVP exceeds the threshold, the frequency sweeper stops the frequency sweeping. Meanwhile, the current-sense 42 detects no signal across the sense resistor Rs. Therefore the signal at 24, the output of a switch block 38, is set to be at minimum value so that minimum overlap between switches A,C and B,D is seen. Preferably, a timer 64 is initiated once the OVP exceeds the threshold, thereby initiating a time-out sequence. The duration of the time-out is preferably designed according to the requirement of the loads (e.g., CCFLs of an LCD panel), but could alternately be set at some programmable value. Drive pulses are disabled once the time-out is reached, thus providing safe-operation output of the converter circuit. That is, circuit 60 provides a sufficient voltage to ignite the lamp, but will shut off after a certain period if the lamp is not connected to the converter, so that erroneous high voltage is avoided at the output. This duration is necessary since a non-ignited lamp is similar to an open-lamp condition.

Figure 3:
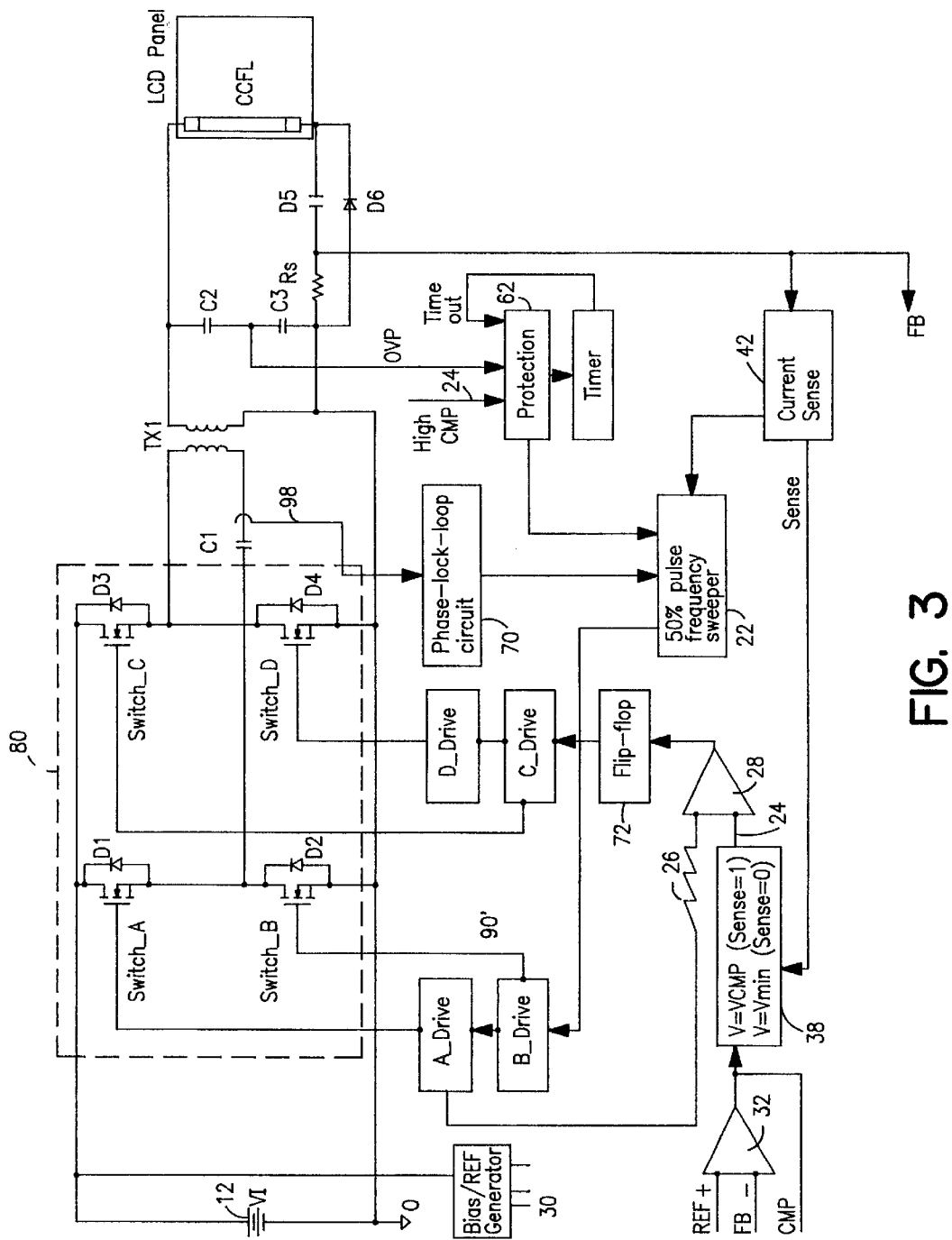
FIG. 3 is another preferred embodiment of a DC/AC converter circuit of the present invention.

FIGS. 3 and 3a–3f depict another preferred embodiment of the DC/AC circuit of the present invention. In this embodiment, the circuit operates in a similar manner as provided in FIG. 2 and FIGS. 2a–2f, however this embodiment further includes a phase lock loop circuit (PLL) 70 for controlling the frequency sweeper 22, and a flip-flop circuit 72 to time the input of a signal into C_Drive. As can be understood by the timing diagrams, if the 50% driving pulses of switches C and D are shifted to the right by increasing the level of CMP, an increase in the overlap between switches A,C and B,D is realized, thus increasing the energy delivered to the transformer. In practice, this corresponds to the higher-lamp current operation (as may be required, e.g., by a manual increase in the REF voltage, described above). Conversely, shifting the driving pulses of switches C and D to the left (by decreasing the CMP signal) decreases the energy delivered. The phase-lock-loop circuit 70 maintains the phase relationship between the feedback current (through Rs) and tank current (through TX1/C1) during normal operation, as shown in FIG. 3. The PLL circuit 70 preferably includes input signals from the tank circuit (C1 and the primary of TX1) signal 98 and Rs (FB signal, described above). Once the CCFL is ignited, and the current in the CCFL is detected through Rs, the PLL 70 circuit is activated which locks the phase between the lamp current and the current in the primary resonant tank (C1 and transformer primary). That is, the PLL is provided to adjust the frequency of the frequency sweeper 22 for any parasitic variations such as temperature effect, mechanical arrangement like wiring between the converter and the LCD panel and distance between the lamp and metal chassis of LCD panel that affect the capacitance and inductance. Preferably, the system maintains a phase difference of 180 degrees between the resonant tank circuit and the current through Rs (load current). Thus, irrespective of the particular load conditions and/or the operating frequency of the resonant tank circuit, the system finds an optimal operation point.

The operation of the feedback loop of FIG. 3 is similar to the description above for FIG. 2. However, as shown in FIG. 3b, this embodiment times the output of an initiating signal through C_Drive through flip-flop 72. For instance, during normal operation, the output of the error amplifier 32 is fed through the controlled switch block 38 (described above), resulting in signal 24. A certain amount of overlap between switches A,C and B,D is seen through comparator 28 and flip-flop 72 which drives switches C and D (recall D_Drive produces the complementary signal of C_Drive). This provides a steady-state operation for the CCFL (panel) load. Considering the removal of the CCFL (panel) during the normal operation, CMP rises to the rail of output of the error amplifier and triggers the protection circuit immediately. This function is inhibited during the ignition period.

Referring briefly to FIGS. 3a–3f, the triggering of switches C and D, through C-Drive and D_Drive, is, in this embodiment, alternating as a result of the flip-flop circuit 72. As is shown in FIG. 3b, the flip-flop triggers every other time, thereby initiating C_Drive (and, accordingly, D_Drive). The timing otherwise operates in the same way as discussed above with reference to FIGS. 2a–2f.

Figure 4A:
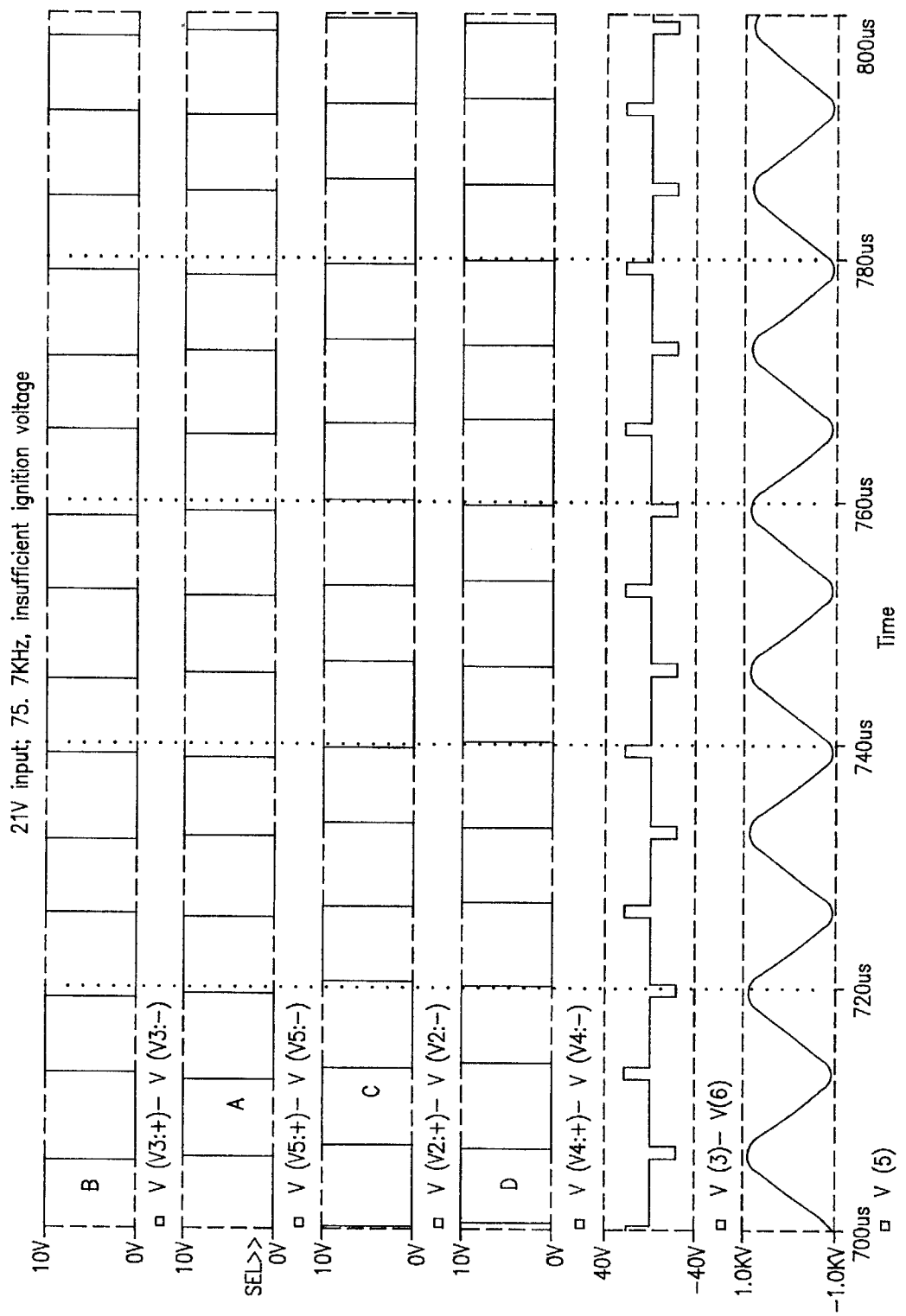
FIGS. 4a–4f depict emulation diagrams for the circuits shown in FIGS. 2 and 3.
Figure 4B:
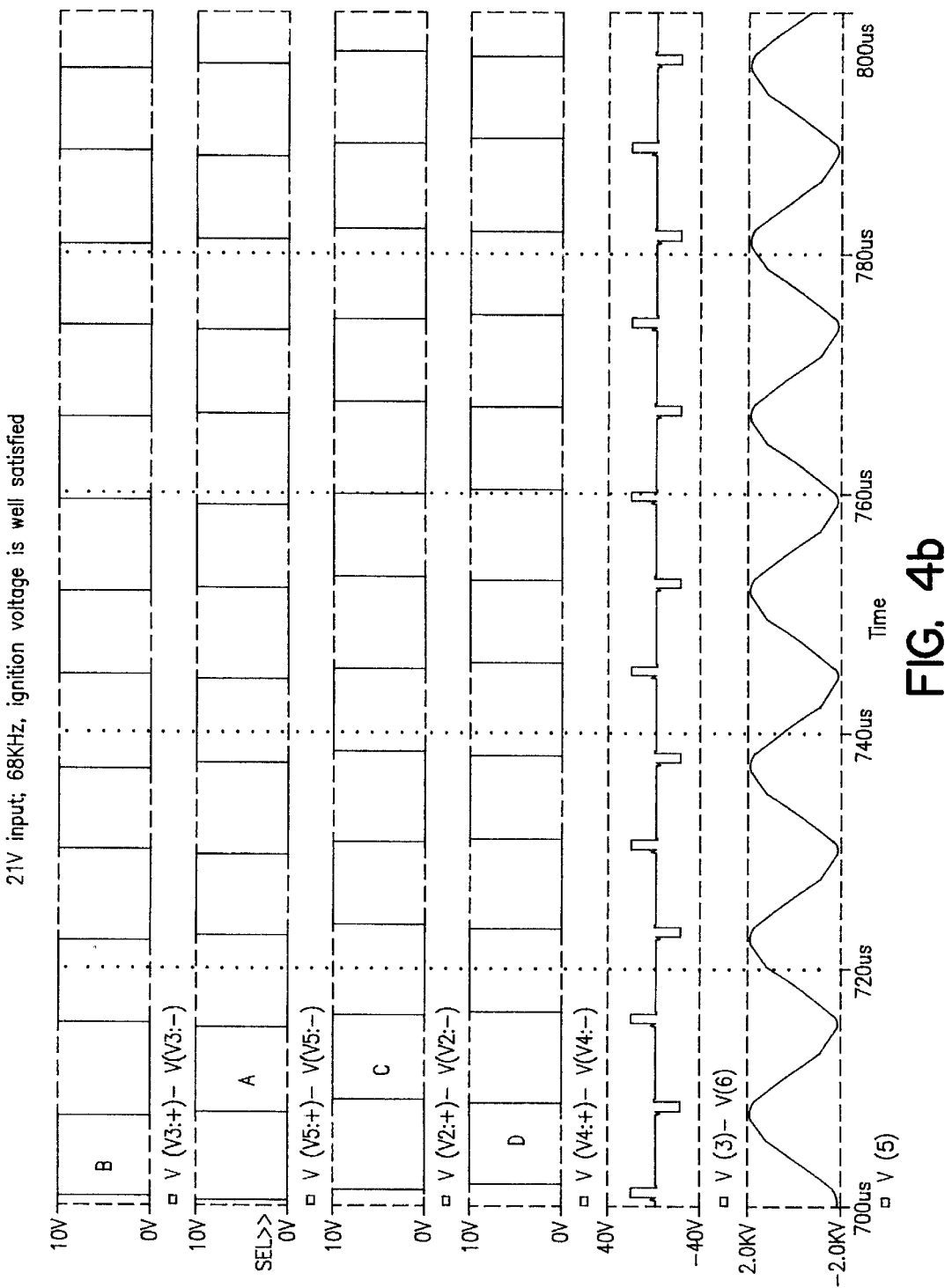
Figure 4C:
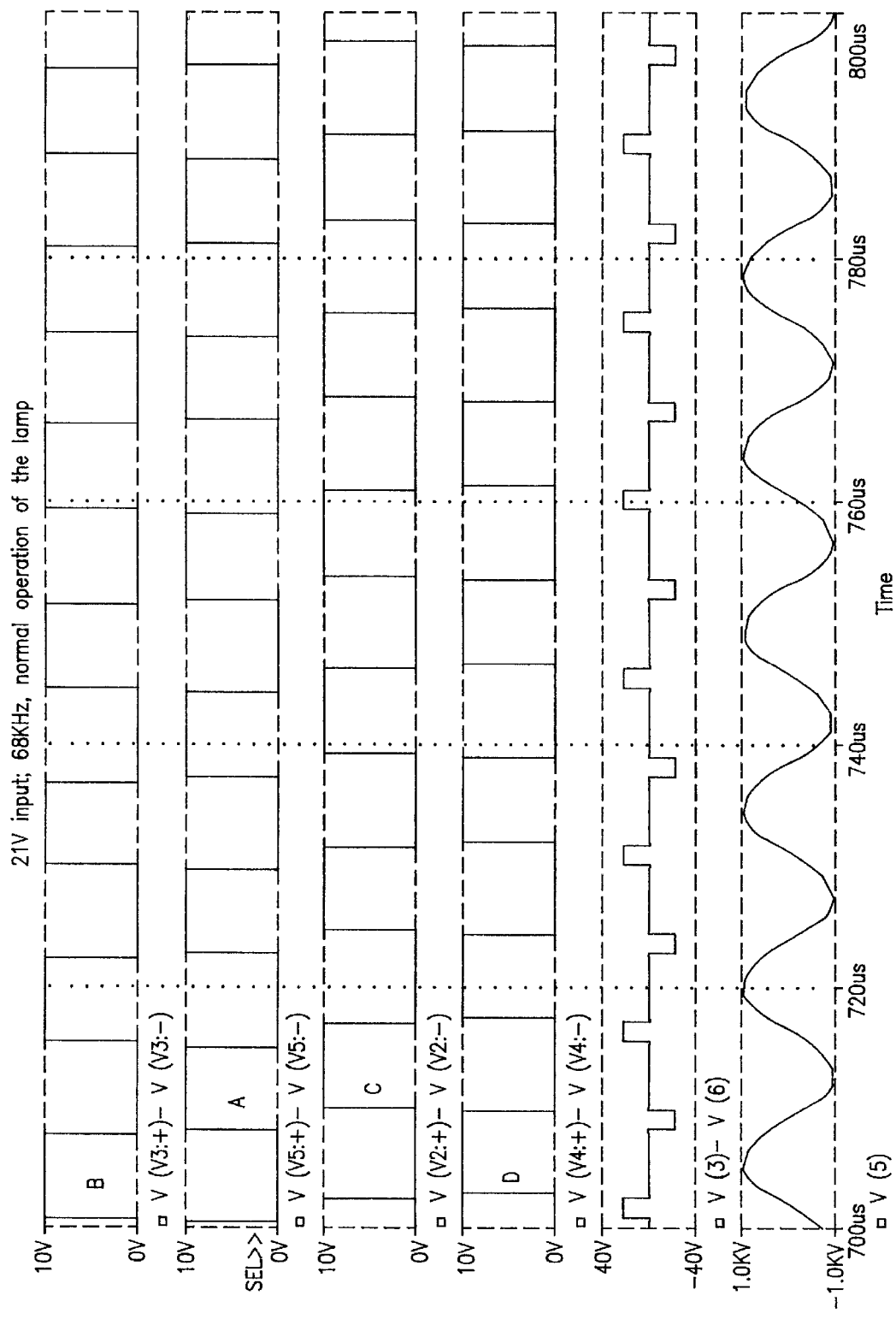
Figure 4D:
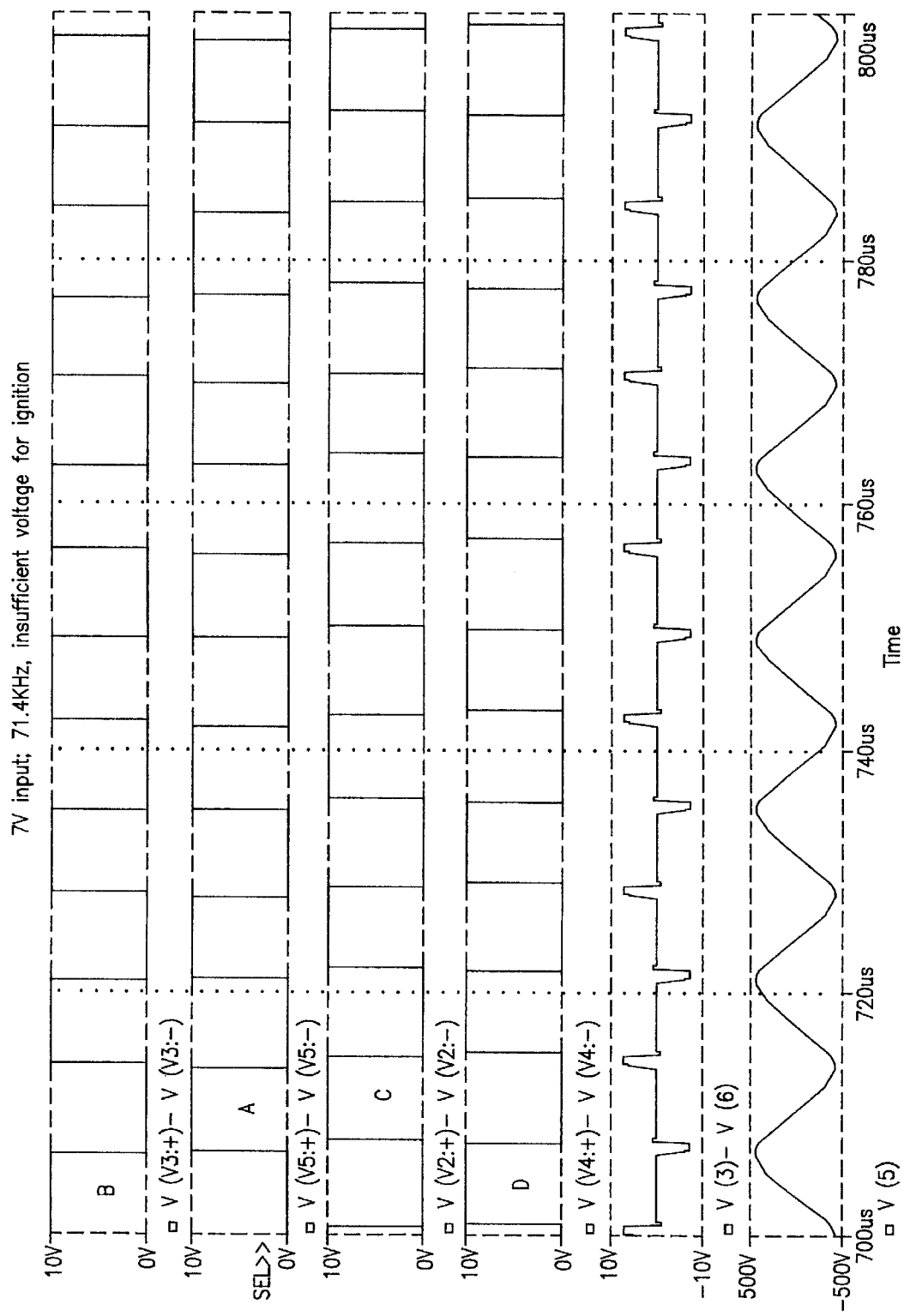
Figure 4E:
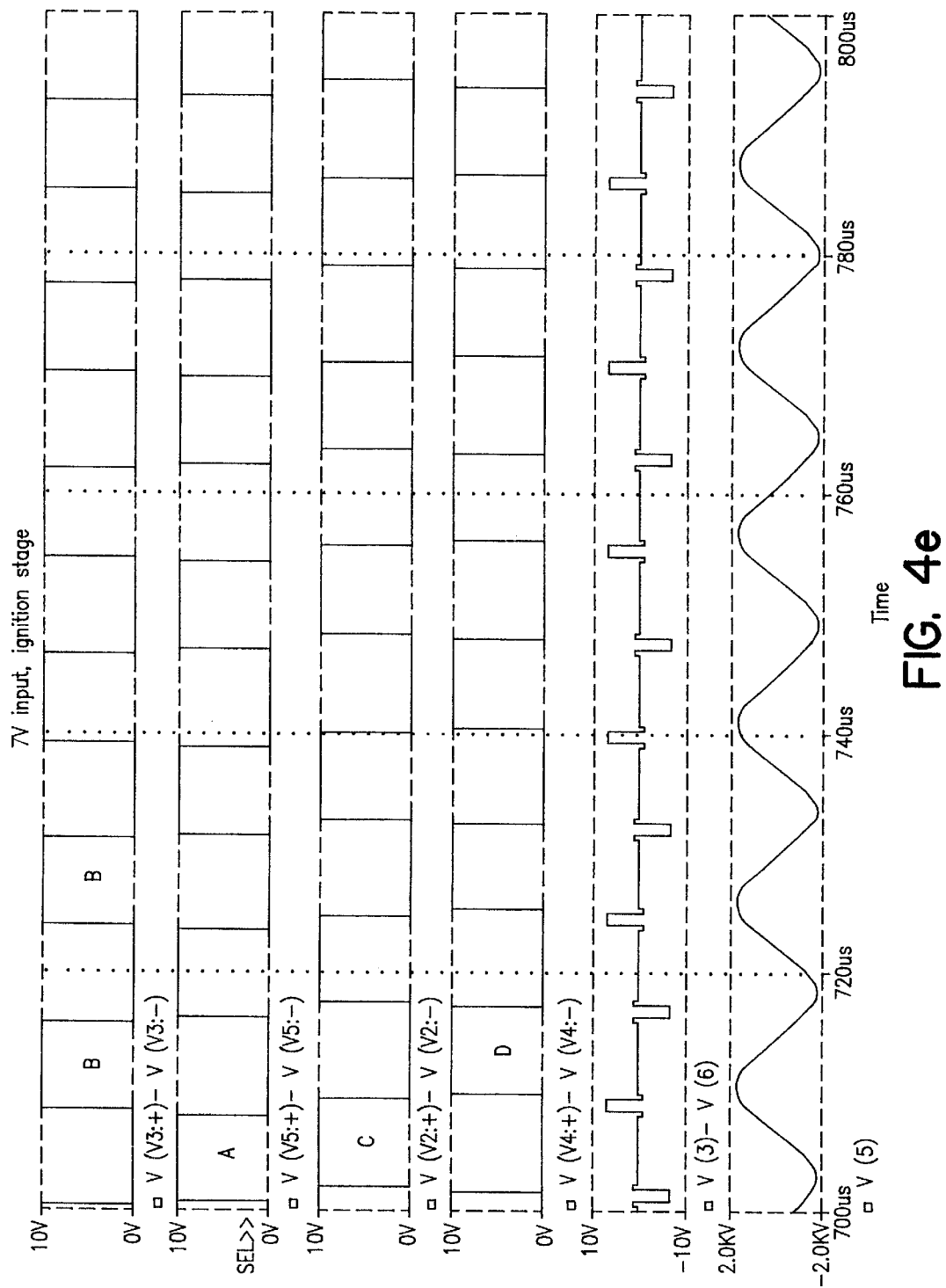
Figure 4F:
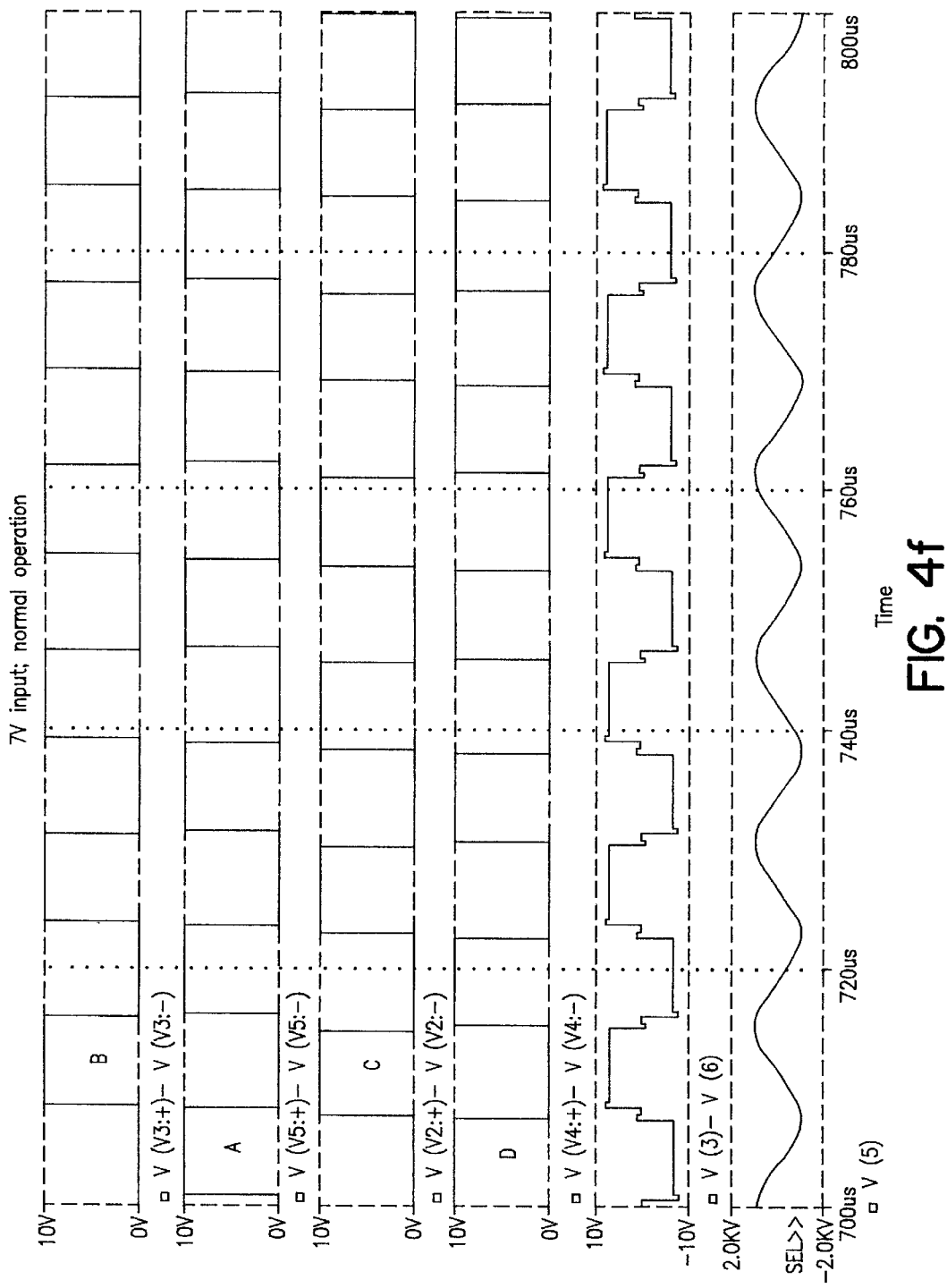

Referring now to FIGS. 4a–4f, the output circuit of FIG. 2 or 3 is emulated. For example, FIG. 4a shows that at 21V input, when the frequency sweeper approaches 75.7 KHz (0.5 us overlapping), the output is reaching 1.67 KVp-p. This voltage is insufficient to turn on the CCFL if it requires 3300 Vp-p to ignite. As the frequency decreases to say 68 KHz, the minimum overlap generates about 3.9 KVp-p at the output, which is sufficient to ignite the CCFL. This is illustrated in FIG. 4b. At this frequency, the overlap increases to 1.5 us gives output about 1.9 KVp-p to operate the 130 Kohm lamp impedance. This has been shown in FIG. 4c. As another example, FIG. 4d illustrates the operation while the input voltage is 7V. At 71.4 KHz, output is 750 Vp-p before the lamp is striking. As the frequency decreases, the output voltage increases until the lamp ignites. FIG. 4e shows that at 65.8 KHz, the output reaches 3500 Vp-p. The regulation of the CCFL current is achieved by adjusting the overlap to support 130 Kohm impedance after ignition. The voltage across the CCFL is now 1.9 KVp-p for a 660 Vrms lamp. This is also illustrated in FIG. 4f. Although not shown, the emulation of the circuit of FIG. 3 behaves in a similar manner.

It should be noted that the difference between the first and second embodiments (i.e., by the addition of the flip flop and the PLL in FIG. 3) will not effect the overall operational parameters set forth in FIGS. 4a–4f. However, the addition of the PLL has been determined to account for non-ideal impedances that develop in the circuit, and may be added as an alternative to the circuit shown in FIG. 2. Also, the addition of the flip-flop permits the removal of the constant current circuit, described above.

Thus, it is evident that there has been provided a high efficiency adaptive DC/AC converter circuit that satisfies the aims and objectives stated herein. It will be apparent to those skilled in the art that modifications are possible. For example, although the present invention has described the use of MOSFETs for the switched, those skilled in the art will recognize that the entire circuit can be constructed using BJT transistors, or a mix of any type of transistors, including MOSFETs and BJTs. Other modifications are possible. For example, the drive circuitry associated with Drive_B and Drive_D may be comprised of common-collector type circuitry, since the associated transistors are coupled to ground and are thus not subject to floating conditions. The PLL circuit described herein is preferably a generic PLL circuit 70, as is known in the art, appropriately modified to accept the input signal and generate the control signal, described above. The pulse generator 22 is preferably a pulse width modulation circuit (PWM) or frequency width modulation circuit (FWM), both of which are well known in the art. Likewise, the protection circuit 62 and timer are constructed out of known circuits and are appropriately modified to operate as described herein. Other circuitry will become readily apparent to those skilled in the art, and all such modifications are deemed within the spirit and scope of the present invention, only as limited by the appended claims.

What is claimed is:

1. A DC/AC converter circuit for controllably delivering power to a load, comprising an input voltage source; a first plurality of overlapping switches and a second plurality of overlapping switches being selectively coupled to said voltage source, said first plurality of switches defining a first conduction path, said second plurality of switches defining a second conduction path; a pulse generator generating a first pulse signal; a transformer having a primary side and a secondary side, said primary side selectively coupled to said voltage source in an alternating fashion through said first conduction path and, alternately, through said second conduction path; a load coupled to said secondary side of said transformer; and a feedback control loop circuit receiving a feedback signal indicative of power being supplied to said load, and adapted to generate a second signal pulse signal for controlling the conduction state of said second plurality of switches only if said feedback signal is above a predetermined threshold; and drive circuitry receiving said pulse signal and controlling a conduction state of said first and second plurality of switches based on said first and second pulse signals, wherein, said drive circuitry alternating the conduction state of said first and second plurality of switches, controlling the overlap time of the switches in the first plurality of switches, and controlling the overlap time of the switches in the second plurality of switches, to couple said voltage source to said primary side.

2. A circuit as claimed in claim 1, wherein said input voltage source comprises a DC voltage.

3. A circuit as claimed in claim 1, wherein said drive circuitry generating:

a first complimentary pulse signal from said first pulse signal; and a ramp signal;

wherein said first pulse signal being supplied to a first one of said first plurality of switches to control the conduction state thereof, said ramp signal being compared with at least said feedback signal to generate said second pulse signal, said second pulse signal being supplied to a second one of said first plurality of switches and controlling the conduction state thereof, wherein a controllable overlap condition exists between the conduction state of said first and second switches of said first plurality of switches; said drive circuitry further generating a second complimentary pulse signal based on said second pulse signal; wherein said first and second complimentary pulse signals controlling the conduction state of a first and second ones of said second plurality of switches, respectively, wherein a controllable overlap condition exists between the conduction state of said first and second switches of said second plurality of switches.

4. A circuit as claimed in claim 3, wherein said first and second plurality of switches comprising MOSFET transistors.

5. A circuit as claimed in claim 4, wherein each said transistor further comprising an intrinsic switch in parallel with each transistor in reverse bias with respect to said voltage source, each said intrinsic switch for bleeding off energy stored within said primary side of said transformer by completing a conduction path between said voltage source and said primary side when said transistors are in a non-conducting state.

6. A circuit as claimed in claim 5, wherein said intrinsic switch comprises a diode.

7. A circuit as claimed in claim 3, wherein a phase difference between said first pulse signal and said first complimentary pulse signal is approximately 180 degrees; a phase difference between said second pulse signal and said second complimentary pulse signal is approximately 180 degrees, so that a short circuit condition does not exist between said first conduction path and said second conduction path.

8. A circuit as claimed in claim 7, wherein the conduction state of said first plurality of switches and said second plurality of switches determining the power delivered to said load.

9. A circuit as claimed in claim 3, wherein said feedback control loop comprising a first comparator for comparing a reference signal with said feedback signal and producing a first output signal, and a second comparator for comparing said first output signal with said ramp signal and producing said second pulse signal based on the intersection of said first output signal and said ramp signal.

10. A circuit as claimed in claim 9, wherein said load feedback signal being a measure of the current flowing through said load.

11. A circuit as claimed in claim 9, further comprising a current sense circuit receiving said feedback signal and generating a trigger signal; said feedback loop circuit further comprising a switch circuit between said first and second comparator, said switch circuit receiving said trigger signal and generating either said first output signal or a predetermined minimum signal, based on the value of said trigger signal; wherein said predetermined minimum signal causes said second comparator to generate a second pulse signal that decouples said second ones of said first and second plurality of switches from said load.

12. A circuit as claimed in claim 9, wherein said reference signal being generated by a reference signal generator, and being indicative of a desired power delivered to said load.

13. A circuit as claimed in claim 9, further comprising an overcurrent protection circuit receiving said feedback signal and controlling said pulse generator based on the value of said feedback signal; and an overvoltage protection circuit receiving a voltage signal from across said load and said first output signal and comparing voltage signal from across said load and said first output signal, and controlling said pulse generator based on the value of said voltage signal from across said load.

14. A circuit as claimed in claim 1, wherein said pulse generator comprising a programmable pulse frequency generator circuit and being programmed to initiate said converter circuit with a pulse frequency having a 50% duty cycle and starting with a predetermined frequency, and sweeping said frequency downward at a predetermined rate and at predetermined steps.

15. A circuit as claimed in claim 1, wherein said load comprises one or more cold cathode fluorescent lamps (CCFLs).

16. A circuit as claimed in claim 1, wherein said primary side comprising a resonant tank circuit comprising an inductor and a capacitor.

17. A circuit as claimed in claim 1, wherein said secondary side comprising a voltage divider circuit in parallel with an inductor in parallel with said load.

18. A converter circuit for delivering power to a CCFL load, comprising:

a voltage source;

a transformer having a primary side and a secondary side;

a first pair of switches and a second pair of switches defining a first and second conduction path, respectively, between said voltage source and said primary side;

a CCFL load circuit coupled to said secondary side;

a pulse generator generating a first pulse signal;

a feedback circuit coupled to said load receiving a feedback signal indicative of power being supplied to said load, and adapted to generate a second signal pulse signal for controlling the conduction state of said second plurality of switches only if said feedback signal is above a predetermined threshold; and drive circuitry receiving said pulse signal and controlling a conduction state of said first and second plurality of switches based on said first and second pulse signals; and drive circuitry receiving said pulse signal and said feedback signal and coupling said first pair of switches or said second pair of switches to said voltage source and said primary side based on said first and second pulse signals and said feedback signal to deliver power to said load.

19. A circuit as claimed in claim 18, wherein said first pulse signal having a predetermined frequency; said drive circuitry comprising a first, second, third and fourth drive circuits; said first pair of switches comprising first and second transistors, said second pair of switches comprising third and fourth transistors; said first, second, third and fourth drive circuits connected to the control lines of said first, second, third and fourth transistors, respectively; said first pulse signal supplied to said first drive circuit so that said first transistor is switched in accordance with said first pulse signal, said third drive circuit generating a first complimentary pulse signal and a ramp signal based on said drive signal and supplying said first complimentary pulse signal to said third transistor so that said third transistor is switched in accordance with said first complimentary pulse signal; said ramp signal and said feedback signal being compared to generate said second pulse signal, said second pulse signal being supplied to said second drive circuit so that said second transistor is switched in accordance with said second pulse signal; said fourth driving circuit generating a second complementary pulse signal based on said second pulse signal and supplying said second complementary pulse signal to said fourth transistor so that said fourth transistor is switched in accordance with said second complimentary pulse signal; wherein the simultaneous conduction of said first and second transistors, and said third and fourth transistors, respectively, controls the amount of power delivered to said load.

20. A circuit as claimed in claim 19, wherein said first pulse signal and first complementary pulse signal being approximately 180° out of phase, said second pulse signal and said second complementary signal being approximately 180° out of phase, and said pulse signal and said second pulse signal being controlled to deliver power along said first conduction path, and said first complementary signal and said second complementary signal being controlled to deliver power along said second conduction path.

21. A circuit as claimed in claim 19, wherein said feedback circuit comprises a first comparator for comparing said feedback signal with a reference signal and generating a first output signal; and a second comparator for comparing said first output signal with said ramp signal and generating said second pulse signal based on the intersection between said ramp signal and said first output signal.

22. A circuit as claimed in claim 21, wherein said reference signal being generated by a reference voltage generator, and being indicative of a desired power value to be delivered to said load.

23. A circuit as claimed in claim 21, further comprising an overvoltage protection circuit coupled to said load and said pulse generator, said overvoltage protection circuit receiving as input the voltage across said load and controlling said pulse generator based on said on the value of said voltage across said load.

24. A circuit as claimed in claim 23, wherein said overvoltage protection circuit comprises a comparator for comparing said voltage signal across said load and said first output signal and generating a control signal to said pulse generator to control the power delivered by said pulse generator.

25. A circuit as claimed in claim 24, wherein said overvoltage protection circuit further comprises a timer circuit wherein said control signal being controlled by a predetermined time generated by said timer circuit.

26. A circuit as claimed in claim 21, further comprising an overcurrent protection circuit coupled to said pulse generator and receiving as input said feedback signal, and controlling said pulse generator based on the value of said feedback signal.

27. A circuit as claimed in claim 19, wherein said first and third transistors being coupled together is series with each other and in parallel with said voltage source and said primary side, said second and fourth transistors being coupled together in series with each other and in parallel with said voltage source and said primary side.

28. A circuit as claimed in claim 19, further comprising an intrinsic switch in parallel with each said transistor, said intrinsic switch permitting energy to flow from said primary side through said first or second conduction path before each said transistor is switched to conduct.

29. A circuit as claimed in claim 18, wherein said primary side defining a resonant tank circuit having a single resonant operating frequency.

30. A circuit as claimed in claim 19, wherein said first and third drive circuits comprise a totem pole circuit, and said second and fourth drive circuits are selected from the group consisting of: a boot strap circuit, a high-side drive circuit or a level shifting circuit.

31. A circuit as claimed in claim 19, wherein said second and fourth drive circuits further comprising an inverter for generating said first and second complementary pulse signals, respectively.

32. A circuit as claimed in claim 31, wherein said second drive circuit further comprises a sawtooth generating circuit for generating said ramp signal, said sawtooth signal having a frequency matching said first pulse signal.

33. A circuit as claimed in claim 21, further comprising a flip-flop circuit coupled to said second pulse signal and supplying said second pulse signal to said second drive only when said third transistor is switched into a conducting state.

34. A circuit as claimed in claim 18, further comprising a phase-lock loop (PLL) circuit having a first input signal from said primary side and a second input signal using said feedback signal, said PLL circuit sending a control signal to said pulse generator for controlling a pulse width of said pulse signal based on the phase difference between said first and second inputs.

35. A method for controlling a zero-voltage switching circuit to deliver power to a load, said method comprising the steps of:
supplying a DC voltage source;
coupling a first and second transistor defining a first conduction path and a third and fourth transistor defining a second conduction path to said voltage source and a primary side of a transformer;
generating a first pulse signal having a predetermined pulse width;
coupling a load to a secondary side of said transformer;
generating a feedback signal from said load;
generating a second pulse signal by comparing said feedback signal with a threshold signal; and
generating an AC voltage by alternating the conduction state of said first and second transistors with said first pulse signal, and said third and fourth transistors with said second pulse signal only if said feedback signal exceeds said threshold signal.

36. A method as claimed in claim 35, further comprising the step of timing the conduction of said transistors so that said first and third transistors do not conduct simultaneously, and said second and fourth transistors do not conduct simultaneously.

37. A method as claimed in claim 35, further comprising the steps of:
generating a first and second complementary signals based on said first and second pulse signals;
generating a ramp signal;
comparing said ramp signal to said feedback signal and generating said second pulse signal;
supplying said first pulse signal to said first transistor to control the conduction state thereof and supplying said second pulse signal to said second transistor to control the conduction state thereof;
supplying said first complementary signal to said third transistor to control the conduction state thereof and supplying said second complimentary signal to said fourth transistor to control the conduction state thereof; and
controlling the simultaneous conduction of said first and second transistors, and said third and forth transistors, to deliver power to generate said AC voltage.

38. A method as claimed in claim 37, further comprising the steps of:
comparing said feedback signal with a reference signal and generating a first output signal based thereon; and
comparing said first output signal with said ramp signal and generating said second pulse signal.

39. A method as claimed in claim 35, further comprising the step of controlling said pulse generator based on a voltage signal across said load.

40. A method as claimed in claim 35, further comprising the step of controlling said pulse generator based on said feedback signal.

41. A method as claimed in claim 35, further comprising the steps of:
supplying a first signal indicative of voltage across said primary said and a second signal indicative of the current through said load to a phase-lock circuit;
locking a phase between said first and second signals and generating a control signal based thereon; and
supplying said control signal to said pulse generator to adjust the pulse width of said pulse signal based on a phase difference between said first and second signals.

42. A method as claimed in claim 37, wherein said step of comparing said first output signal with said ramp signal and generating said second pulse signal further comprises the step of generating said second pulse signal based on the intersection of said ramp signal and said first output signal.

\* \* \* \* \*

UNITED STATES PATENT AND TRADEMARK OFFICE
CERTIFICATE OF CORRECTION

PATENT NO. : 6,259,615 B1
DATED : July 10, 2001
INVENTOR(S) : Lin

It is certified that error appears in the above-identified patent and that said Letters Patent is hereby corrected as shown below:

<u>Title page,</u>
Item [73], Assignee should read as follows: -- O2 Micro International Limited, Grand Cayman, Cayman Islands --.
Item, [63], Related U.S. Application Data, should read as follows: -- Provisional Application No. 60/145,118 filed on July 22, 1999 --.

<u>Column 13,</u>
Line 56, delete "on the" after the first "said".

<u>Column 14,</u>
Line 7, change "is" to -- in --.

<u>Column 16,</u>
Line 12, delete "said" after "primary".

Signed and Sealed this

Twenty-ninth Day of July, 2003

JAMES E. ROGAN
*Director of the United States Patent and Trademark Office*

(12) EX PARTE REEXAMINATION CERTIFICATE (6544th)
United States Patent
Lin

(10) Number: US 6,259,615 C1
(45) Certificate Issued: Dec. 2, 2008

(54) HIGH-EFFICIENCY ADAPTIVE DC/AC CONVERTER

(75) Inventor: Yung-Lin Lin, Palo Alto, CA (US)

(73) Assignee: O2 Micro International Limited, Grand Cayman (KY)

Reexamination Request:
No. 90/008,009, Apr. 13, 2006
No. 90/008,380, Dec. 15, 2006

Reexamination Certificate for:
Patent No.: 6,259,615
Issued: Jul. 10, 2001
Appl. No.: 09/437,081
Filed: Nov. 9, 1999

Certificate of Correction issued Jul. 29, 2003.

Related U.S. Application Data

(60) Provisional application No. 60/145,118, filed on Jul. 22, 1999.

(51) Int. Cl.
- H02M 7/505 (2006.01)
- H02M 7/5387 (2006.01)
- H05B 41/282 (2006.01)
- H05B 41/28 (2006.01)
- H05B 41/285 (2006.01)
- H05B 41/392 (2006.01)
- H05B 41/39 (2006.01)

(52) U.S. Cl. .................... 363/98; 315/225; 315/307; 363/25

(58) Field of Classification Search .................. 363/98, 363/41, 21.01
See application file for complete search history.

(56) References Cited

U.S. PATENT DOCUMENTS

| | | |
|---|---|---|
| 4,682,084 A | 7/1987 | Kuhnel et al. |
| 4,859,912 A | 8/1989 | Lippmann et al. |
| 5,239,293 A | 8/1993 | Barbier |
| 5,834,907 A | 11/1998 | Takehara |
| 5,844,378 A | 12/1998 | LoCascio et al. |
| 5,923,129 A * | 7/1999 | Henry .................. 315/307 |

FOREIGN PATENT DOCUMENTS

WO    WO 9819369    3/1998

OTHER PUBLICATIONS

A.F. Ahrens and G.I. Cardwell, "Arc Discharge Supply Component Prtection Circuitry", PESC 76 Record, 1976, pp. 326–333.*

Frank Goodenough, "DC–to–AC Inverter Ups CCFL Lumens Per Watt", Jul. 10, 1995, Electronic Design, MPS '129 990–993.*

Nalbant—Phase Modulated PWM Topology With the ML4818, Micro Linear Application Note 42026 Date: Jun. 1996 total 16 pages.

Inventor: Nagai—Projector Device Patent Abstracts of Japan Publication No. 05–113604 Date of publication: May 7, 1993 total 20 pages.

Inventor: Koda, Takashima—Lighting Device Patent Abstract of Japan Publication No. 64–014895 Date of publication: Jan. 19, 1989 total 15 pages.

(Continued)

Primary Examiner—Anjan K. Deb

(57) ABSTRACT

A CCFL power converter circuit is provided using a high-efficiency zero-voltage-switching technique that eliminates switching losses associated with the power MOSFETs. An optimal sweeping-frequency technique is used in the CCFL ignition by accounting for the parasitic capacitance in the resonant tank circuit. Additionally, the circuit is self-learning and is adapted to determine the optimum operating frequency for the circuit with a given load. An over-voltage protection circuit can also be provided to ensure that the circuit components are protected in the case of open-lamp condition.

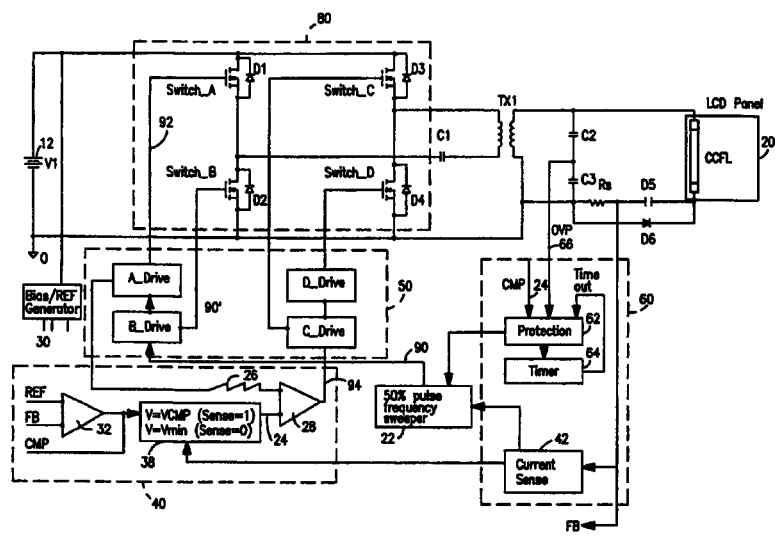

OTHER PUBLICATIONS

Inventor: Koda, Takashima—Lighting Apparatus European Patent Application Publication No. 0298934A1 Date of publication: Nov. 1, 1989 total: 14 pages.

Inventor: Takehara Cold–Cathode Tube Lighting Apparatus Using Piezoelectric Transformer, Patent Abstract of Japan Publication No. 08–138876 Publication Date: May 31, 1996 total 25 pages.

T.H. Yu et al.,—Comparisons Among Self–Excited Parallel Resonant, Series Resonant and Current–Fed Push–Pull Electronic Ballasts, IEEE 1994 (MPS trial exhibit '129 000914–000920) total 7 pages.

Product Highlights—DC/AC Inverter Improves Lighting Efficiency, Electronic Products Apr. 1996 total 1 page.

Raab—Analysis of Idealized Class–D Power Amplifiers, Green Mountain Radio Research Company, 1982 total 21 pages.

Roddam—Transistor Inverters and Converters, Iliffe Books Ltd., 1963 MPS trial exhibit MPS'722000191–197 total 7 pages.

LMX1597–01 Preliminary Data Sheet Linfinity Microelectronics May 1996 (MPS trial exhibit MPS '722 000205–209) total 5 pages.

Linfinity Brochure Referencing LIN Doc. #1596–98, 1997 (MPS trial exhibit MPS ' 722 000203–204) total 2 pages.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–42 is confirmed.

1. A DC/AC converter circuit for controllably delivering power to a load, comprising an input voltage source; a first plurality of overlapping switches and a second plurality of overlapping switches being selectively coupled to said voltage source, said first plurality of switches defining a first conduction path, said second plurality of switches defining a second conduction path; a pulse generator generating a first pulse signal; a transformer having a primary side and a secondary side, said primary side selectively coupled to said voltage source in an alternating fashion through said first conduction path and, alternately, through said second conduction path; a load coupled to said secondary side of said transformer; and a feedback control loop circuit receiving a feedback signal indicative of power being supplied to said load, and adapted to generate a second signal pulse signal for controlling the conduction state of said second plurality of switches only if said feedback signal is above a predetermined threshold; and drive circuitry receiving said pulse signal and controlling a conduction state of said first and second plurality of switches based on said first and second pulse signals, wherein, said drive circuitry alternating the conduction state of said first and second plurality of switches, controlling the overlap time of the switches in the first plurality of switches, and controlling the overlap time of the switches in the second plurality of switches, to couple said voltage source to said primary side.

\* \* \* \* \*